United States Patent Office 2,706,727
Patented Apr. 19, 1955

2,706,727

COPOLYMERS OF N-SUBSTITUTED TRIFLUORO-ACETAMIDES AND METHOD OF MAKING SAME

Harry W. Coover, Jr., and Joseph B. Dickey, Kingsport, Tenn., assignors to Eastman Kodak Company, Rochester, N. Y., a corporation of New Jersey No Drawing. Application June 10, 1952,
Serial No. 292,712

10 Claims. (Cl. 260—85.5)

This invention relates to new compounds of the formula:

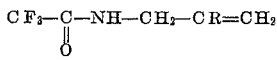

where R is selected from the group consisting of hydrogen and methyl, to a method of preparing these compounds, and to polymeric compositions containing polymers or copolymers of these compounds. Copolymerization of these compounds with other monomeric substances coming within the group known as monosubstituted ethylene compounds, such as styrene, acrylonitrile, methylmethacrylate and the like forms part of the invention.

We have unexpectedly found that valuable plastic masses can be made up by homo- or co-polymerizing the above trifluorinated N-substituted acetamides, which monomeric compounds themselves are also novel. We have also found that despite the presence of the three fluorine atoms, trifluoroacetic anhydride will react with allyl amine or methallylamine under the proper conditions to form the novel monomeric compounds.

Our invention has as its objects the method of making the monomers, the novel monomers themselves as new compounds, and the formation of polymers and copolymers from the monomers. These and other objects will be apparent from the following descriptive matter.

The new polymers and copolymers may be prepared in mass, in solution, in suspension or emulsion in aqueous or other suitable diluents.

The usual catalyst or initiating agents are used and certain so-called activating agents such as sodium bisulfite may be used in connection with the usual catalyst. The homopolymers of N-allyltrifluoroacetamides are in general low molecular weight liquid products. Copolymerization with other vinyl monomers, particularly in the range of 5–50% of the amide leads to solid polymers. The properties of the various copolymers are dependent on the type of monomer and the amount of it present in the polymer. Products ranging from soft, rubbery materials to high softening rigid polymers can be obtained.

The new monomers are readily prepared by reacting trifluoroacetic anhydride with an allyl amine.

The following examples will further illustrate the invention, but the invention is not to be considered as limited thereto.

PREPARATION OF THE MONOMERS

*Example 1.—N-allyltrifluoroacetamide*

Twenty-eight and five-tenths grams of allyl amine was slowly added to 98 g. of trifluoroacetic anhydride in 300 ml. of ether in a three-necked flask equipped with a stirrer, condenser and dropping funnel. The reaction flask was cooled in an ice bath so that the temperature never exceeded 5° C. during the addition. The reaction mixture was then allowed to warm up to room temperature and poured into 200 ml. water. The ether layer was separated, dried and distilled. A good yield of product, B. P. 53–54° C. 5 mm. was obtained.

*Example 2.—N-methallyltrifluoroacetamide*

Thirty-five and five-tenths grams of methallyl amine was slowly added to 98 g. of trifluoroacetic anhydride in 300 ml. of ether in a three-necked flask, equipped with a stirrer, condenser and dropping funnel. The reaction flask was cooled in an ice bath so that the temperature never exceeded 5° C. during the addition. The reaction mixture was then allowed to warm up to room temperature and poured into 200 ml. of water. The ether layer was separated, dried and distilled. A good yield of product B. P. 65–67°/5 mm. was obtained.

PREPARATION OF HOMOPOLYMERS

*Example 1*

Ten grams of N-allyltrifluoroacetamide and 0.3 g. of acetyl peroxide were heated in a sealed tube at 100° C. for 48 hours. The resultant polymer was a light yellow viscous oil soluble in acetonitrile.

*Example 2*

Ten grams of N-methallyltrifluoroacetamide and 0.3 g. of acetyl peroxide were heated in a sealed tube at 100° C. for 36 hours. The resultant polymer was a light yellow viscous oil soluble in acetone.

PREPARATION OF COPOLYMERS

*Example 1*

Nine grams of styrene, 1 g. of N-allyltrifluoroacetamide and 0.1 g. of acetyl peroxide were copolymerized at 60° C. in an atmosphere of nitrogen. Product is a clear, moldable polymer soluble in benzene.

*Example 2*

Eight grams of methylmethacrylate and 2 g. of N-methallyltrifluoroacetamide and 0.2 g. of benzoyl peroxide were copolymerized at 80° C. in an atmosphere of nitrogen. The product was a clear, moldable polymer. The polymer is soluble in acetone.

*Example 3*

Eight grams of acrylonitrile, 2 g. of N-methallyltrifluoroacetamide, 0.1 g. of ammonium persulfate and 0.1 g. of sodium bisulfite were added to 100 ml. of distilled water. Polymerization was completed by heating at 35° C. for 16 hours. The resultant polymer was soluble in such solvents as dimethylacetamide and dimethylformamide.

*Example 4*

Six grams of acrylonitrile, 4 g. of N-allyltrifluoroacetamide, 0.1 g. of ammonium persulfate, 0.1 g. of sodium bisulfite and 1 g. of potassium laurate were added to 100 ml. of distilled water. The polymerization was completed by heating at 450° C. for 16 hours. The resultant polymer was soluble in such solvents as dimethylformamide and dimethylacetamide.

*Example 5*

Five grams of N-allyltrifluoroacetamide and 10 g. of vinyl chloride were emulsified in 50 ml. of water using 0.5 g. polyvinyl alcohol as an emulsifying agent and polymerized at 60–70° C. using ammonium persulfate as a catalyst. After about 24 hours acetic acid was added and the white precipitated polymer filtered, washed and dried. The polymer is soluble in cyclohexanone.

We claim:
1. A method of copolymerizing a trifluorinated amide of the formula

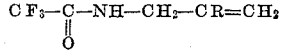

where R is selected from the group consisting of hydrogen and methyl, comprising mixing the amide with at least one polymerizable monosubstituted ethylene compound selected from the group consisting of styrene, methylmethacrylate, acrylonitrile and vinyl chloride to form a mixture consisting of said amide and said ethylene compound containing 5 to 50% of the amide and heating the mixture at a temperature up to 80° C. in the presence of a peroxide catalyst.

2. A process according to claim 1 wherein the ethylene compound is styrene.

3. A process according to claim 1 wherein the ethylene compound is methylmethacrylate.

4. A process according to claim 1 wherein the ethylene compound is acrylonitrile.

5. A process according to claim 1 wherein the ethylene compound is vinyl chloride.

6. A polymeric product obtained by mixing an amide of the formula

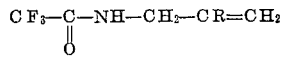

where R is selected from the group consisting of hydrogen and methyl, with at least one polymerizable monosubstituted ethylene compound selected from the group consisting of styrene, methylmethacrylate, acrylonitrile and vinyl chloride to form a mixture consisting of said amide and said ethylene compound containing 5 to 50% of the amide and heating the mixture at a temperature up to 80° C. in the presence of a peroxide catalyst.

7. A polymeric product according to claim 6 wherein the ethylene compound is styrene.

8. A polymeric product according to claim 6 wherein the ethylene compound is methylmethacrylate.

9. A polymeric product according to claim 6 wherein the ethylene compound is acrylonitrile.

10. A polymeric product according to claim 6 wherein the ethylene compound is vinyl chloride.

References Cited in the file of this patent

UNITED STATES PATENTS

| | | |
|---|---|---|
| 2,456,428 | Parker | Dec. 14, 1948 |
| 2,587,957 | Bauer | Mar. 4, 1952 |
| 2,592,218 | Weisgerber | Apr. 8, 1952 |
| 2,596,650 | Caldwell | May 13, 1952 |

OTHER REFERENCES

Swarts: Bull. Acad. Royal Belgique, vol. 8, 1922, pp. 343, 357, 358, 359.

Cloez: Annales de Chimie et de Physique, Series 6, vol. 9 (1886), pp. 216, 220.

Karrer: Organic Chemistry, Elsevier, 1946, p. 209.